US006935162B2

(12) United States Patent
Oki et al.

(10) Patent No.: US 6,935,162 B2
(45) Date of Patent: Aug. 30, 2005

(54) APPARATUS FOR DETECTING LEAKAGE IN AN EVAPORATED FUEL PROCESSING SYSTEM

(75) Inventors: Hideyuki Oki, Saitama (JP); Eisaku Gosyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 10/674,793

(22) Filed: Oct. 1, 2003

(65) Prior Publication Data

US 2004/0129068 A1 Jul. 8, 2004

(30) Foreign Application Priority Data

Oct. 9, 2002 (JP) ...................................... 2002-296659

(51) Int. Cl.[7] .......................... G01M 3/04; G01L 27/00

(52) U.S. Cl. ............................ 73/49.2; 73/40; 73/1.59; 702/51

(58) Field of Search ......................... 73/40, 49.2, 1.59; 702/51

(56) References Cited

U.S. PATENT DOCUMENTS 4,852,054 A * 7/1989 Mastandrea .................. 702/51
5,408,866 A * 4/1995 Kawamura et al. ............ 73/40
5,644,072 A * 7/1997 Chirco et al. ................ 73/49.2
5,763,764 A * 6/1998 Mieczkowski et al. ........ 73/40
5,898,103 A * 4/1999 Denz et al. .................. 73/49.2
6,192,742 B1 * 2/2001 Miwa et al. ................... 73/40
6,343,505 B1 * 2/2002 Cook et al. ................ 73/118.1
6,357,288 B1 * 3/2002 Shigihama et al. ........ 73/118.1
6,477,889 B2 * 11/2002 Yamaki ................... 73/40.5 R

FOREIGN PATENT DOCUMENTS

JP 06-117332 4/1994
JP 11-336626 12/1999

* cited by examiner

*Primary Examiner*—Michael Cygan
(74) *Attorney, Agent, or Firm*—Arent Fox PLLC

(57) ABSTRACT

An apparatus for determining leakage in an evaporated fuel processing system is provided. The evaporated fuel processing system extends from a fuel tank to a purge passage through which evaporated fuel from the fuel tank is purged to an intake manifold of an engine. The apparatus comprises a pressure sensor for detecting a pressure of the evaporated fuel processing system, an atmospheric pressure sensor for detecting an atmospheric pressure, and a control unit connected to the pressure sensor and the atmospheric pressure sensor. The control unit detects a stop of the engine. A determination value used for the leakage determination is corrected according to the atmospheric pressure. The evaporated fuel processing system is closed after the stop of the engine is detected. It is determined whether the evaporated fuel processing system has leakage based on the pressure detected by the pressure sensor and the corrected determination value. Since the determination value is corrected according to the atmospheric pressure, leakage is accurately determined regardless of whether the vehicle is located in highlands or lowlands.

18 Claims, 9 Drawing Sheets

APPARATUS FOR DETECTING LEAKAGE IN AN EVAPORATED FUEL PROCESSING SYSTEM

BACKGROUND OF THE INVENTION

The present invention relates to an apparatus for detecting leakage in an evaporated fuel processing system after an internal-combustion engine is stopped.

Various methods have been proposed for detecting leakage in an evaporated fuel processing system that processes evaporated fuel generated in a fuel tank. Japanese Patent No. 2751758 discloses a method for detecting leakage in an evaporated fuel processing system. According to the method, a change in the pressure of the system is compared with a determination value after the system is placed under a negative pressure. It is determined whether there is leakage in the system based on the comparison result. The determination value is set according to the atmospheric pressure.

Leakage detection for the evaporated fuel processing system may be carried out after the internal-combustion engine is stopped. According to the method disclosed in Japanese Patent Application Unexamined Publication No. 11-336626, the evaporated fuel processing system is placed under a negative pressure after the engine is stopped. Leakage in the evaporated fuel processing system is detected based on a change in the pressure of the system.

Since the atmospheric pressure in highlands is lower than in lowlands, the amount of the evaporated fuel generated in highlands is greater than in lowlands. In highlands, the pressure of the evaporated fuel processing system may significantly increase due to the evaporated fuel.

In a conventional method as described above, a determination value used for the leakage detection is constant regardless of whether the vehicle is located in highlands or lowlands. According to the conventional method, an erroneous determination may be made because the amount of evaporated fuel changes according to whether the vehicle is located in highlands or lowlands.

Therefore, there is a need for an apparatus and a method in which leakage detection is accurately performed regardless of whether the vehicle is located in highlands or lowlands.

SUMMARY OF THE INVENTION

According to one aspect of the present invention, an apparatus for determining leakage in an evaporated fuel processing system is provided. The evaporated fuel processing system extends from a fuel tank to a purge passage through which evaporated fuel from the fuel tank is purged to an intake manifold of an engine. The apparatus comprises a pressure sensor for detecting a pressure of the evaporated fuel processing system, an atmospheric pressure sensor for detecting an atmospheric pressure, and a control unit connected to the pressure sensor and the atmospheric pressure sensor. The control unit detects a stop of the engine. A determination value used for the leakage determination is corrected according to the atmospheric pressure detected by the atmospheric pressure sensor. After the stop of engine is detected, the control unit closes the evaporated fuel processing system. The pressure detected by the pressure sensor is compared with the corrected determination value. It is determined whether the evaporated fuel processing system has leakage based on the comparison result.

According to the invention, the leakage determination can be accurately performed regardless of whether the vehicle is located in highlands or lowlands because the determination value is corrected with the atmospheric pressure of the place in which the vehicle is located.

According to one embodiment of the invention, the pressure detected by the pressure sensor is monitored to determine a change in the pressure. It is determined that the evaporated fuel processing system has leakage if the change in the detected pressure is less than the determination value.

According to one embodiment of the invention, the correction of the determination value is made so that the determination value increases as the atmospheric pressure decreases. Thus, in highlands where a large amount of evaporated fuel is generated, the determination value is made greater.

According to one embodiment of the invention, a table in which a coefficient corresponding to the atmospheric pressure is defined is provided. The control unit retrieves the coefficient corresponding to the atmospheric pressure from the table. The determination value is corrected with the retrieved coefficient.

According to another aspect of the invention, the pressure detected by the pressure sensor is corrected according to the atmospheric pressure detected by the pressure sensor. The corrected pressure is compared with a predetermined determination value. It is determined whether the evaporated fuel processing system has leakage based on the comparison result.

DESCRIPTION OF THE PREFERRED EMBODIMENTS

Figure 1:
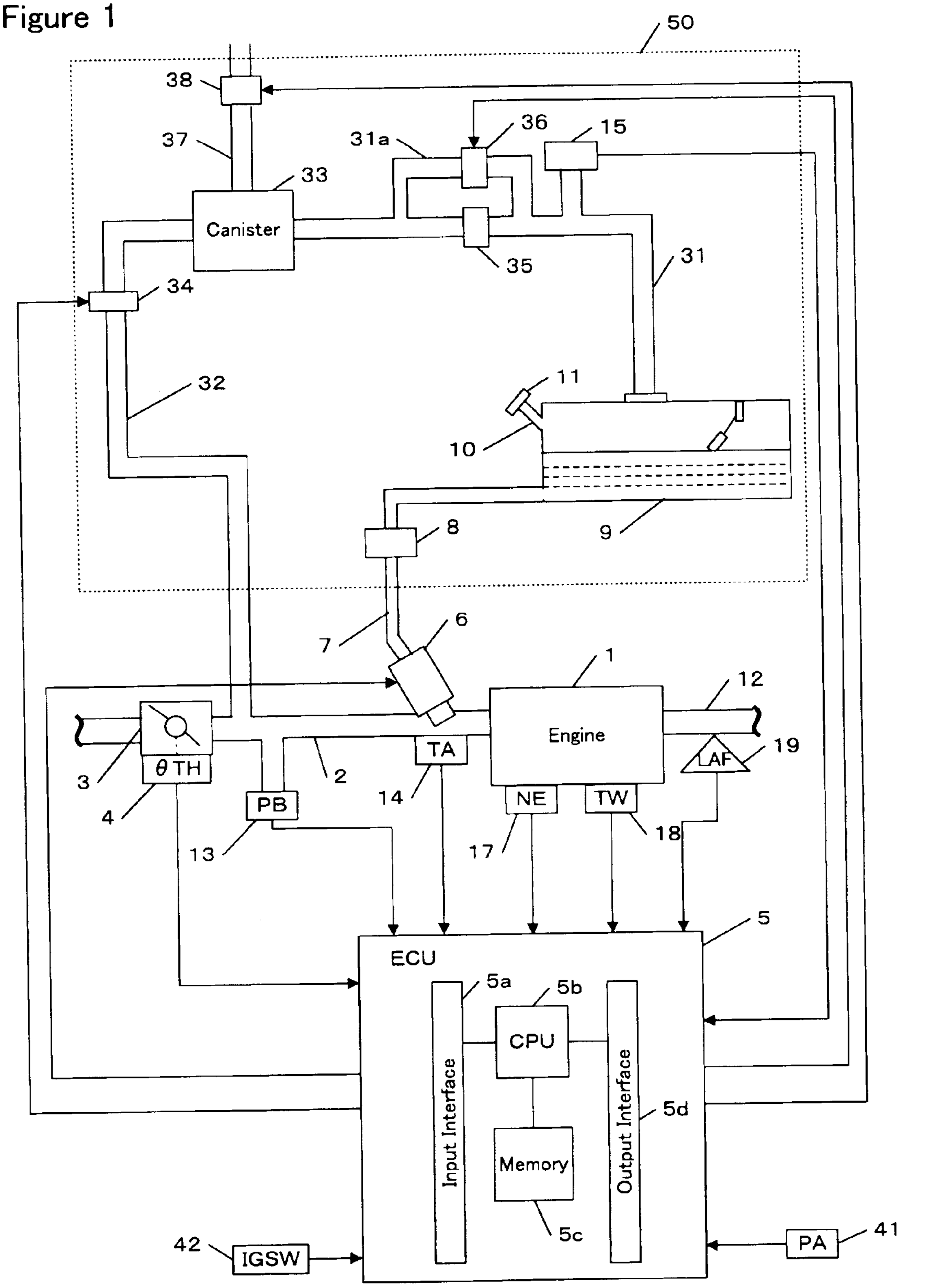
FIG. 1 schematically shows an evaporated fuel processing apparatus and a controller for an internal-combustion engine in accordance with one embodiment of the invention.

Referring to the drawings, specific embodiments of the invention will be described. FIG. 1 is a block diagram showing an engine and its controller in accordance with one embodiment of the invention.

An electronic control unit (hereinafter referred to as an ECU) 5 comprises an input interface 5*a* for receiving data sent from each part of the engine 1, a CPU 5*b* for carrying out operations for controlling each part of the engine 1, a memory 5*c* including a read only memory (ROM) and a random access memory (RAM), and an output interface 5*d* for sending control signals to each part of the engine 1. Programs and various data for controlling each part of the vehicle are stored in the ROM. A program for performing a leakage determination process according to the invention, data and tables used for operations of the program are stored in the ROM. The ROM may be a rewritable ROM such as an EEPROM. The RAM provides work areas for operations by the CPU 5*a*, in which data sent from each part of the engine 1 as well as control signals to be sent out to each part of the engine 1 are temporarily stored.

The engine 1 is, for example, an engine equipped with four cylinders. An intake manifold 2 is connected to the engine 1. A throttle valve 3 is disposed upstream of the intake manifold 2. A throttle valve opening (θ TH) sensor 4, which is connected to the throttle valve 3, outputs an electric signal corresponding to an opening angle of the throttle valve 3 and sends the electric signal to the ECU 5.

A fuel injection valve 6 is installed for each cylinder at an intermediate point in the intake manifold 2 between the engine 1 and the throttle valve 3. The opening time of each injection valve 6 is controlled by a control signal from the ECU 5. A fuel supply line 7 connects the fuel injection valve 6 and the fuel tank 9. A fuel pump 8 provided at an intermediate point in the fuel supply line 7 supplies fuel from the fuel tank 9 to the fuel injection valve 6. A regulator (not shown) that is provided between the pump 8 and the fuel injection valve 6 acts to maintain the differential pressure between the pressure of the air taken in from the intake manifold 2 and the pressure of the fuel supplied via the fuel supply line 7 at a constant value. In cases where the pressure of the fuel is too high, the excess fuel is returned to the fuel tank 9 via a return line (not shown).

Thus, the air taken in via the throttle valve 3 passes through the intake manifold 2. The air is mixed with the fuel injected from the fuel injection valves 6, and is then supplied to the cylinders of the engine 1.

A fuel entry 10 for refueling is provided in the tank 9. A filler cap 11 is attached to the fuel entry 10.

An intake manifold pressure (PB) sensor 13 and an outside air temperature (TA) sensor 14 are mounted in the intake manifold 2 downstream of the throttle valve 3. These sensors convert the intake manifold pressure and outside air temperature into electrical signals, and send these signals to the ECU 5.

A rotational speed (Ne) sensor 17 is attached to the periphery of the camshaft or the periphery of the crankshaft (not shown) of the engine 1, and outputs a TDC signal pulse at a specified crank angle with every 180-degree rotation of the crankshaft. The TDC signal pulse is sent to the ECU 5. An engine water temperature (TW) sensor 18 is attached to the cylinder peripheral wall, which is filled with cooling water, of the cylinder block of the engine 1. The sensor 18 detects the temperature of the engine cooling water and sends it to the ECU 5.

The engine 1 has an exhaust manifold 12. Exhaust gas is discharged via a ternary catalyst (not shown) constituting an exhaust gas cleansing device, which is installed at an intermediate point in the exhaust manifold 12. A LAF sensor 19 mounted at an intermediate point in the exhaust manifold 12 is a full range air-fuel ratio sensor. The LAF sensor 19 detects the oxygen concentration in the exhaust gas in a wide air-fuel ratio zone, from a rich zone where the air-fuel ratio is richer than the theoretical air-fuel ratio to an extremely lean zone. The detected signal is sent to the ECU 5.

An atmospheric pressure (PA) sensor 41 is connected to the ECU 5. The atmospheric pressure sensor detects the atmospheric pressure and sends it to the ECU 5. An ignition switch 42 is connected to the ECU 5. A switching signal issued by the ignition switch 42 is sent to the ECU 5.

An evaporated fuel processing system 50 will be described. The system 50 comprises a fuel tank 9, charge passage 31, bypass passage 31*a*, canister 33, purge passage 32, two-way valve 35, bypass valve 36, purge control valve 34, passage 37, and vent-shut valve 38.

The fuel tank 9 is connected to the canister 33 via the charge passage 31 so that evaporated fuel from the fuel tank 9 can move into the canister 33. The two-way valve 35 is disposed in the charge passage 31. The two-way valve 35 has a positive pressure valve that opens when the tank pressure is greater than the atmospheric pressure by a first predetermined pressure, and a negative-pressure valve that opens when the tank pressure is less than the pressure of the canister 33 by a second predetermined pressure.

The bypass passage 31*a* that bypasses the two-way valve 35 is provided. The bypass valve 36 is an electromagnetic valve and is disposed in the bypass passage 31*a*. The bypass valve 36 is ordinarily in a closed state. The bypass valve 36 is opened according to a control signal from the ECU 5.

The pressure sensor 15 is disposed between the two-way valve 35 and the fuel tank 9. The output of the pressure sensor is sent to the ECU 5. The output PTANK of the pressure sensor 15 is equal to the pressure within the fuel tank in a state in which the pressure within the fuel tank 9 and the pressure within the canister 33 are stable. When the pressure within the canister 33 or the fuel tank 9 is changing, the output PTANK of the pressure sensor 15 indicates a pressure different from the actual tank pressure. The output of the pressure sensor 15 is hereinafter referred to as "tank internal pressure PTANK."

The canister 33 contains active carbon that adsorbs the evaporated fuel. The canister 33 has an air intake port (not shown in the figure) that communicates with the atmosphere via the passage 37. The vent-shut valve 38 is disposed at an intermediate point in the passage 37. The vent-shut valve 38 is an electromagnetic valve controlled by the ECU 5. The vent-shut valve 38 is opened when the tank is refueled or when evaporated fuel is purged. The vent-shut valve 38 is also opened/closed when the leakage determination, which is described later, is performed. The vent-shut valve 38 is in an open state when it is not driven by a control signal from the ECU 5.

The canister 33 is connected with the intake manifold 2 on the downstream side of the throttle valve 3 via the purge passage 32. The purge control valve 34, which is an electromagnetic valve, is provided at an intermediate point in the purge passage 32. The fuel adsorbed in the canister 33 is appropriately purged to the intake system of the engine via the purge control valve 34. The purge valve 34 continuously controls the flow rate by altering the on/off duty ratio based on a control signal from the ECU 5.

If a large amount of evaporated fuel is generated when the tank is refueled, the two-way valve 35 is opened and the evaporated fuel is absorbed in the canister 33. In a predetermined operating state of the engine 1, a duty ratio of the purge control valve 34 is controlled so that an appropriate amount of evaporated fuel is supplied to the intake manifold 2 from the canister 33.

Signals sent to the ECU 5 are passed to the input interface 5*a*. The input interface 5*a* shapes the input signal waveforms, corrects the voltage levels to specified levels, and converts analog signal values into digital signal values. The CPU 5*b* processes the resulting digital signals, performs operations in accordance with the programs stored in the ROM 5*c*, and creates control signals. The output interface 5*d* sends these control signals to the fuel injection valve 6, the purge control valve 34, the bypass valve 36, and the vent-shut valve 38.

According to one embodiment, during the leakage determination after the ignition switch 42 is turned off, the ECU 5, bypass valve 36, and vent-shut valve 38 are supplied with electric power. The purge control valve 34 is not supplied with electric power after the ignition switch 42 is turned off. The purge control valve 34 is held in a closed state.

Figure 2:
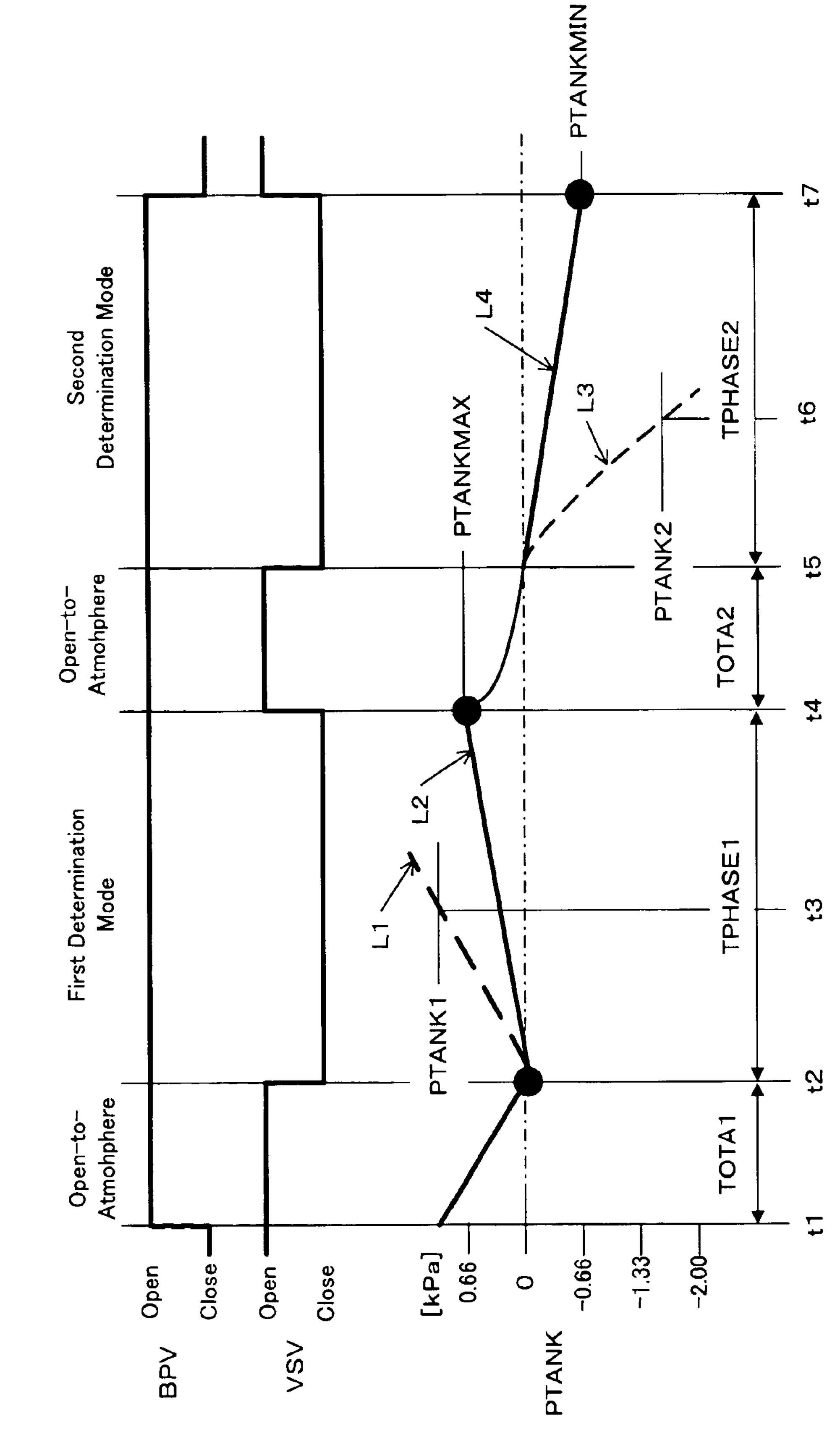
FIG. 2 schematically shows a time chart for leakage determination in accordance with one embodiment of the invention.

FIG. 2 shows a time chart of the leakage determination performed after the engine is stopped. The tank internal pressure PTANK is actually detected as an absolute pressure. However, in the time chart, the tank internal pressure is represented as a differential pressure with respect to the atmospheric pressure.

When the engine is stopped at time t1, the bypass valve 36 is opened and the vent-shut valve 38 is held in an open state. The evaporated fuel processing system 50 is opened to the atmosphere. The tank internal pressure PTANK becomes equal to the atmospheric pressure. The purge control valve 34 is closed when the engine is stopped. A first open-to-atmosphere period continues over a predetermined period TOTA1 (for example, 120 seconds).

At time t2, the vent-shut valve 38 is closed and a first determination mode is started. In the first determination mode, the evaporated fuel processing system 50 is placed in a closed state. The first determination mode continues over a first determination period TPHASE1 (for example, 900 seconds). If the tank internal pressure PTANK exceeds a first determination value PTANK1 (for example, "atmospheric pressure+1.3 kPa (10 mmHg)") as shown by a dashed line L1, it is determined that there is no leakage in the evaporated fuel processing system 50 (at time t3). On the other hand, if the tank internal pressure PTANK does not reach the first determination value PTANK1 as shown by a solid line L2, the maximum tank internal pressure PTANKMAX is stored (at time t4).

At time t4, the vent-shut valve 38 is opened to open the evaporated processing system to the atmosphere. A second open-to-atmosphere period continues over a predetermined period TOTA2 (for example, 120 seconds).

At time t5, the vent-shut valve 38 is closed and a second determination mode is started. The second determination mode continues over a second determination period TPHASE2 (for example, 2400 seconds). If the tank internal pressure PTANK becomes lower than a second determination value PTANK2 (for example, "atmospheric pressure−1.3 kPa (10 mmHg)") as shown by a dashed line L3, it is determined that there is no leakage in the evaporated fuel processing system 50 (at time t6). On the other hand, if the tank internal pressure PTANK changes as shown by a solid line L4, the minimum tank internal pressure PTANKMIN is stored (at time t7). At time t7, the bypass valve 36 is closed and the vent-shut valve 38 is opened.

If there is leakage in the evaporated fuel processing system 50, a change in the tank internal pressure PTANK with respect to the atmospheric pressure is small. Leakage can be detected based on a difference ΔP between the stored maximum tank internal pressure PTANKMAX and the stored minimum tank internal pressure PTANKMIN. If the difference ΔP is greater than a third determination value ΔPTH, it is determined that there is no leakage in the evaporated fuel processing system 50. If the difference ΔP is equal to or less than the third determination value ΔPTH, it is determined that there is leakage in the evaporated fuel processing system 50.

Figure 3:
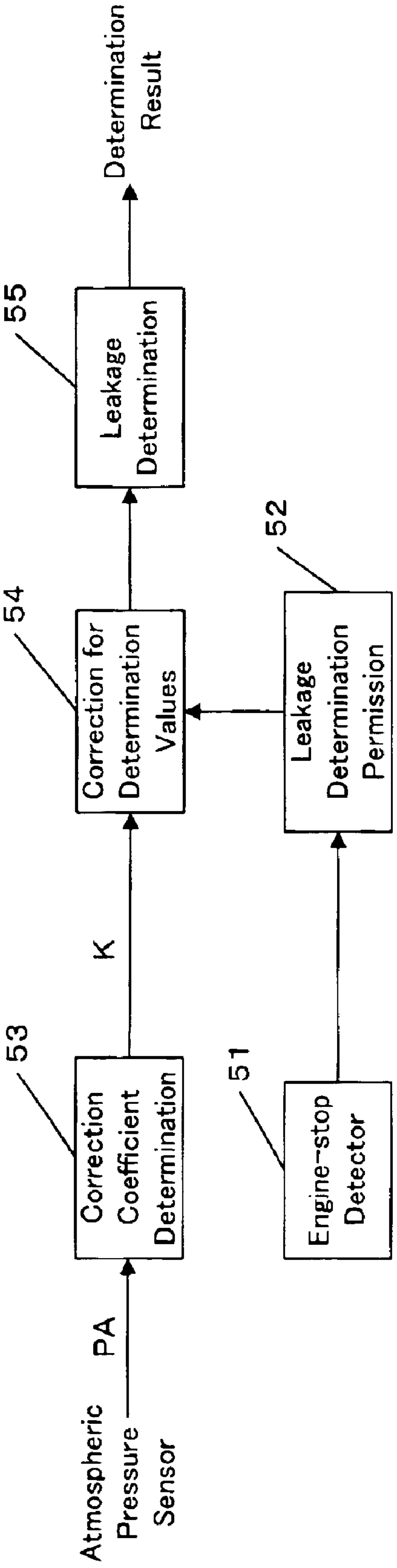
FIG. 3 shows a functional block diagram for a leakage determination apparatus in accordance with one embodiment of the invention.

FIG. 3 is a functional block diagram of a leakage determination apparatus in accordance with a first embodiment of the present invention. An engine-stop detector 51 determines whether the engine is stopped. A leakage determination permission part 52 permits the execution of the leakage determination if the engine is stopped. The leakage determination permission part 52 may, of course, permit the leakage determination if other additional conditions are met.

Figure 4:
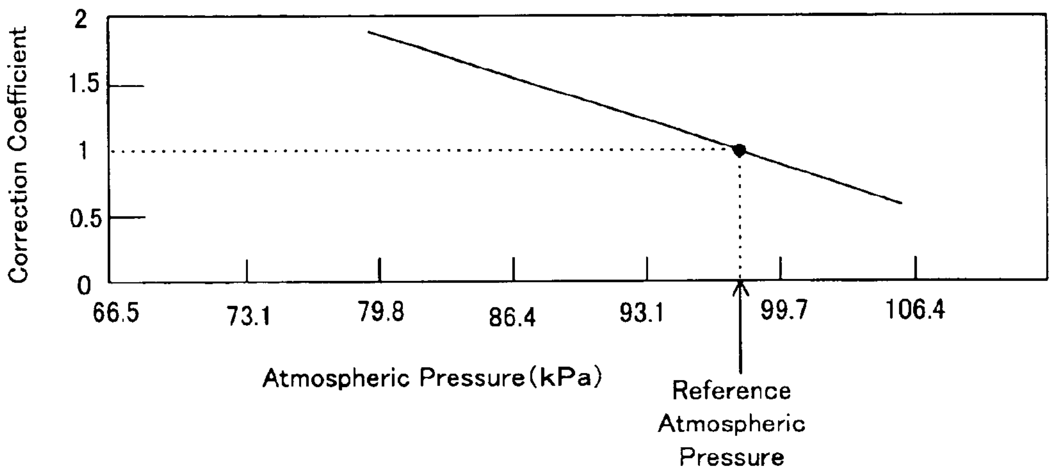
FIG. 4 shows a correction coefficient in accordance with one embodiment of the invention.

A correction coefficient determination part 53 determines a correction coefficient K based on the atmospheric pressure detected by the atmospheric pressure sensor 41. As an example, FIG. 4 shows the correction coefficient determined in accordance with the atmospheric pressure. The correction coefficient is established so that its value becomes larger as the atmospheric pressure becomes lower (that is, as the altitude becomes higher). This is because the amount of the evaporated fuel increases as the altitude is higher. The relationship between the atmospheric pressure and the correction coefficient is stored as a table in the memory 5*c* of the ECU 5.

If the execution of the leakage determination is permitted, a correction part 54 uses the correction coefficient K determined by the correction coefficient determination part 53 to correct the first, second and third determination values PTANK1, PTANK2 and ΔPTH described with reference to FIG. 2. A leakage determination part 55 determines whether the evaporated fuel processing system has leakage based on the corrected determination values and the tank internal pressure PTANK detected by the pressure sensor 15.

Uncorrected first, second and third determination values PTANK1, PTANK2 and ΔPTH are predetermined and are referred to as reference values. The reference values are used in the leakage determination performed under the reference atmospheric pressure. In the embodiment, the reference atmospheric pressure is 98.42 kPa (740 mmHg). The value of the correction coefficient K under the reference atmospheric pressure is one, as shown in FIG. 4. The correction coefficient is smaller as the atmospheric pressure is higher with respect to the reference atmospheric pressure. The correction coefficient is larger as the atmospheric pressure is lower with respect to the reference atmospheric pressure.

Figure 5:
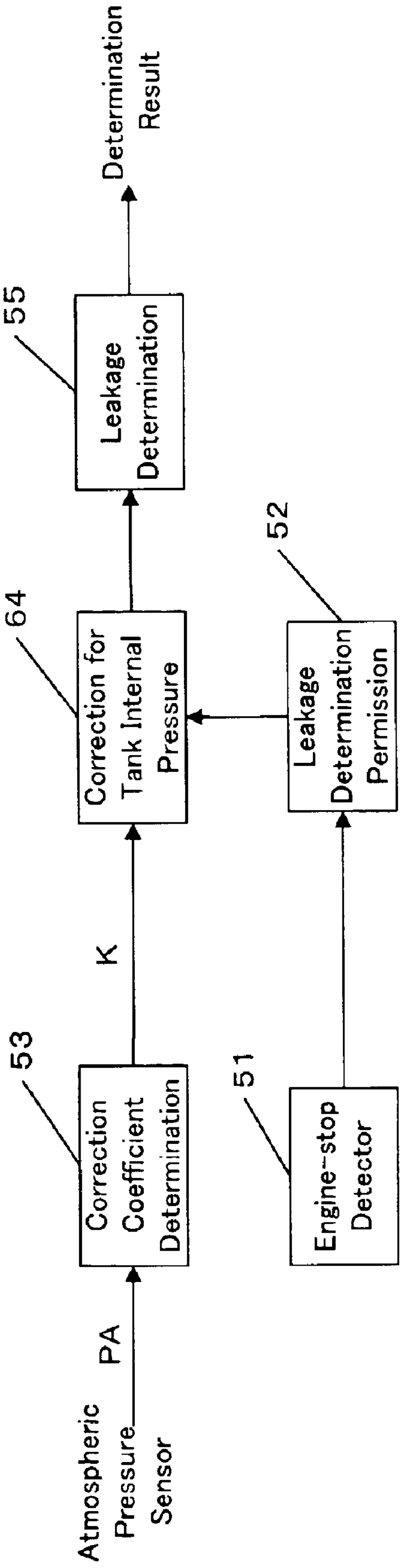
FIG. 5 shows a functional block diagram for a leakage determination apparatus in accordance with another embodiment of the invention.

FIG. 5 is a functional block diagram of a leakage determination apparatus in accordance with a second embodiment of the present invention. The second embodiment is different from the first embodiment in that a correction part 64 that corrects the tank internal pressure is provided instead of the correction part 54 that corrects the determination values. The correction part 64 uses the correction coefficient K, which is determined by the correction coefficient determination part 53, to correct the tank internal pressure PTANK detected by the pressure sensor 15. The leakage determination part 55 determines whether the evaporated fuel processing system has leakage based on the corrected tank internal pressure PTANK and the first through third determination values PTANK1, PTANK 2 and ΔPTH. In the second embodiment, the first, second and third determination values PTANK1, PTANK 2 and ΔPTH are set to the above-described reference values for the reference atmospheric pressure.

Figure 6:
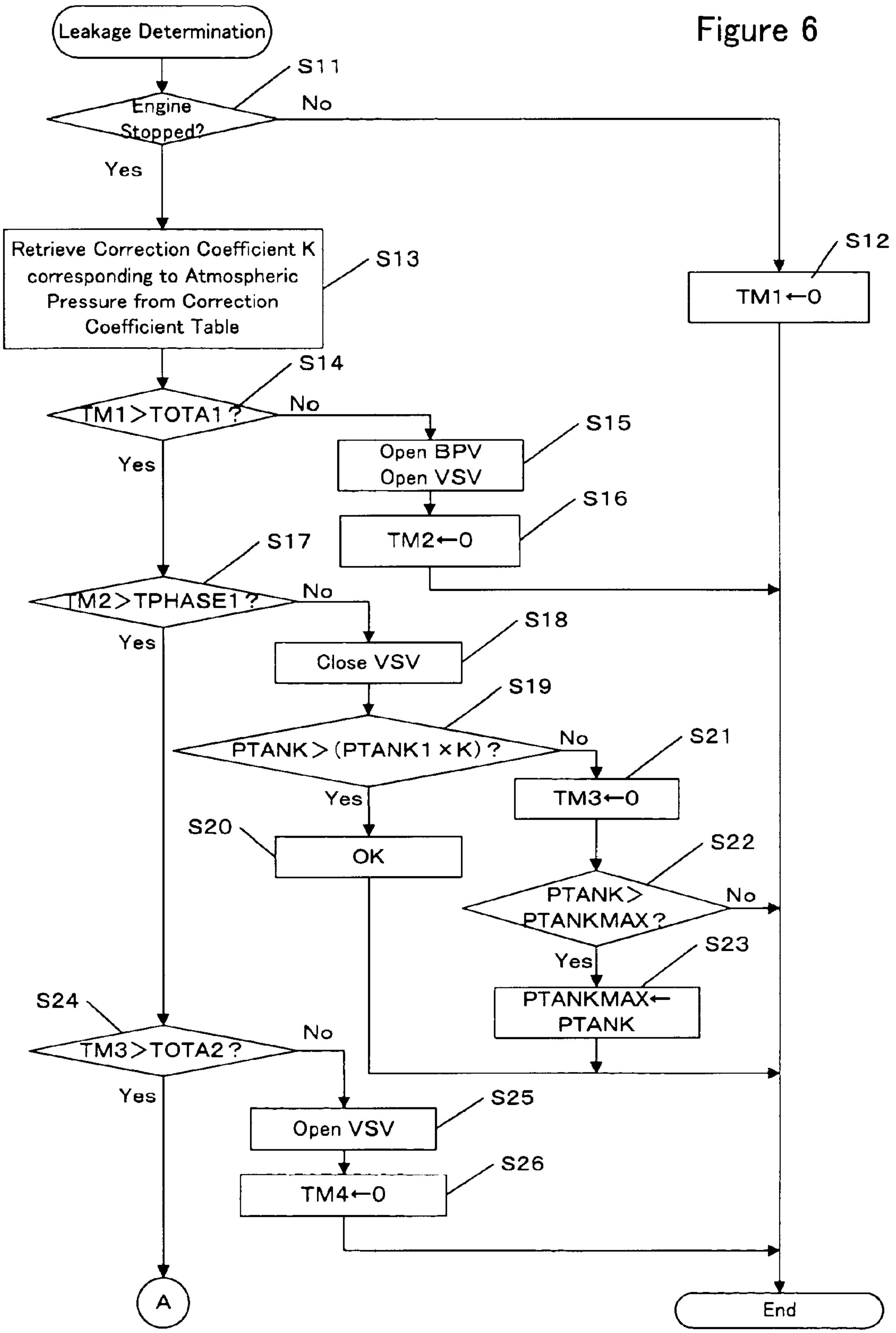
FIG. 6 shows a flowchart of a leakage determination process in accordance with one embodiment of the invention.
Figure 7:
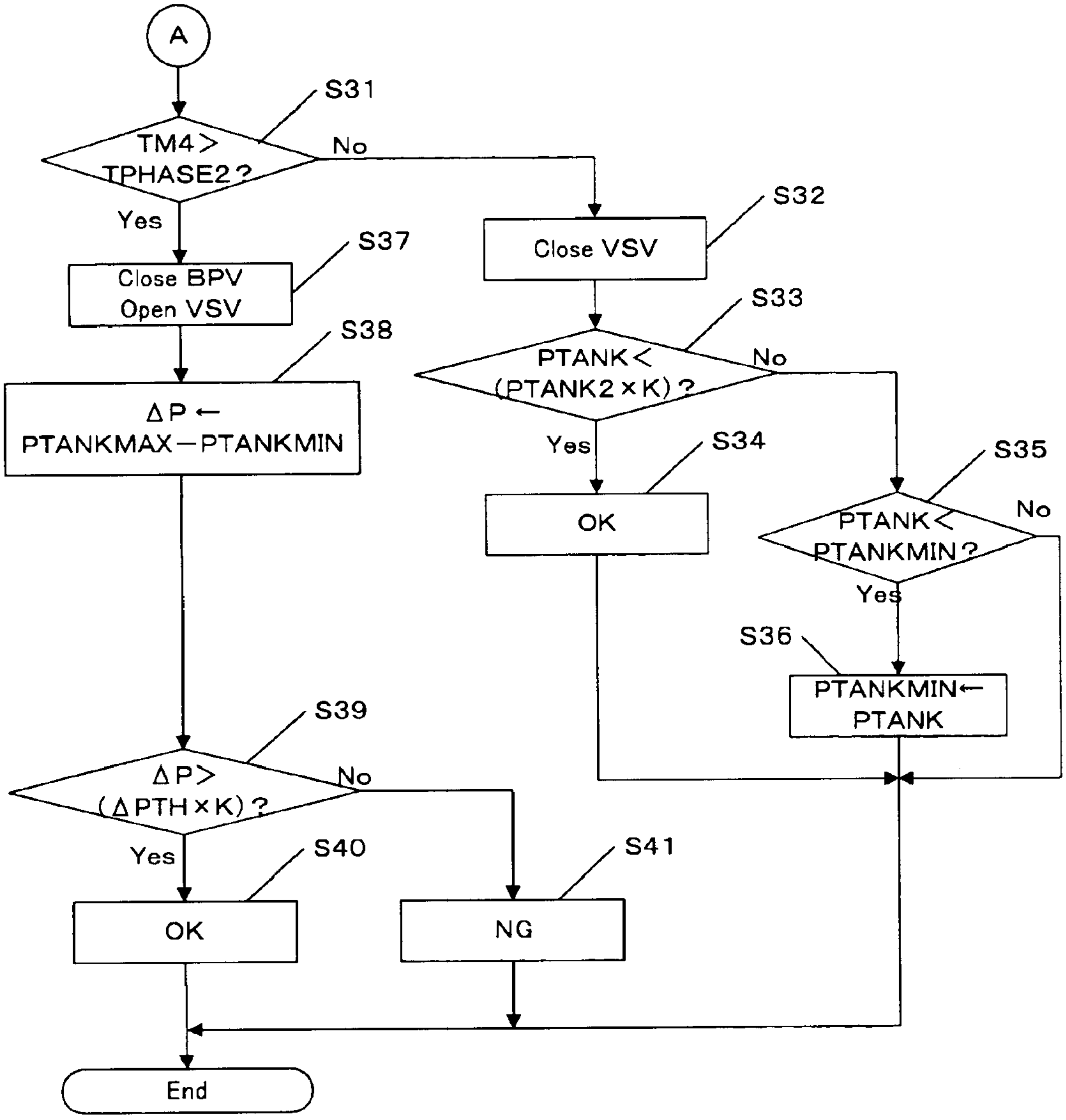
FIG. 7 shows a flowchart of a leakage determination process in accordance with one embodiment of the invention.

FIGS. 6 and 7 show a flowchart of a process for performing the leakage determination in accordance with the first embodiment shown in FIG. 3. This process is carried out at a predetermined time interval (for example, 100 milliseconds).

In step S11, it is determined whether the engine 1 has been stopped. If the engine is in operation, the value of a first count-up timer TM1 is set to zero (S12), and the process exits the routine. The first count-up timer TM1 is a timer that measures the first open-to-atmosphere period TOTA1 (see FIG. 2). If the engine 1 has been stopped, in step S13, the correction coefficient K corresponding to the current atmospheric pressure PA is retrieved from the correction coefficient table.

In step S14, it is determined whether the value of the first count-up timer TM1 has reached the predetermined first open-to-atmosphere period TOTA1. When the step S14 is first performed, the answer of the step is "No." The process proceeds to step S15, in which the bypass valve 36 is opened and the vent-shut valve 38 is held in an open state (at time t1 in FIG. 2). In step S16, the value of a second count-up timer TM2 is set to zero, and the process exits the routine. The second count-up timer TM2 is a timer that measures the first determination period TPHASE1.

If the value of the first count-up timer TM1 has reached the first open-to-atmosphere period TOTA1 (at time t2 of FIG. 2) when the routine is re-entered, the process proceeds to step S17, in which it is determined whether the value of the second count-up timer TM2 has reached the first determination period TPHASE1 (FIG. 2). When the step S17 is first performed, the answer of the step is "No." The process proceeds to step S18, in which the vent-shut valve 38 is closed. In step S19, it is determined whether the tank internal pressure PTANK is greater than a value obtained by multiplying the first determination value PTANK1 by the correction coefficient K.

By multiplying the first determination value PTANK1 by the correction coefficient K, the first determination value PTANK1 is corrected in accordance with the atmospheric pressure of the place where the vehicle is located. The correction is made so that the first determination value PTANK1 is greater as the atmospheric pressure of the place where the vehicle is located is lower.

When step S19 is first performed, the answer of the step is "No." The process proceeds to step S21, in which the value of a third count-up timer TM3 is set to zero. The third count-up timer TM3 is a timer that measures the second open-to-atmosphere period TOTA2 (FIG. 2).

In step S22, it is determined whether the tank internal pressure PTANK is higher than the maximum tank internal pressure PTANKMAX. The initial value of the maximum tank internal pressure PTANKMAX is lower than the atmospheric pressure. Therefore, when the step S22 is first performed, the answer of the step is "Yes." In step S23, the current tank internal pressure PTANK is set in the maximum tank internal pressure PTANKMAX. If the answer of the step S22 is "No," the process exits the routine. Thus, the maximum tank internal pressure PTANKMAX in the first determination mode is obtained.

If the answer of the step S19 is "Yes" (see the dashed line L1 and the time point t3 in FIG. 2), it is determined in step S20 that the evaporated fuel processing system has no leakage because the tank internal pressure PTANK has sharply increased. Thus, the leakage determination process is completed.

If the value of the second count-up timer TM2 has reached the first determination period TPHASE1 (at time t4 in FIG. 2) in step S17 when the routine is re-entered, the process proceeds to step S24. In step S24, it is determined whether the value of the third count-up timer TM3 has reached the second open-to-atmosphere period TOTA2. When the step S24 is first performed, the answer of the step is "No." The process proceeds to step S25, in which the vent-shut valve is opened (at time t4). In step S26, a fourth count-up timer TM4 is set to zero and the process exits the routine. The fourth count-up timer TM4 is a timer that measures the second determination period TPHASE2.

If the value of the third count-up timer TM3 has reached the second open-to-atmosphere period TOTA2 (at time t5 in FIG. 2) in step S24 when the routine is re-entered, the process proceeds to step S31 (FIG. 7). In step S31, it is determined whether the value of the fourth count-up timer TM4 has reached the second determination period TPHASE2. When the step S31 is first performed, the answer of the step is "No." The process proceeds to step S32, in which the vent-shut valve 38 is closed. In step S33, it is determined whether the tank internal pressure PTANK is less than a value obtained by multiplying the second determination value PTANK2 by the correction coefficient K. The second determination value PTANK2 has a negative value. The second determination value PTANK2 decreases as the atmospheric pressure of the place where the vehicle is located is lower.

Since the answer of the step S33 is "No" when the step is first performed, the process proceeds to step S35, in which it is determined whether the tank internal pressure PTANK is lower than the minimum tank internal pressure PTANKMIN. Since the initial value of the minimum tank internal pressure PTANKMIN is higher than the atmospheric pressure, the answer of the step S35 is "Yes" when the step S35 is first performed. In step S36, the current tank internal pressure PTANK is set in the minimum tank internal pressure PTANKMIN. If the answer of the step S35 is "No," the process exits the routine. Thus, the minimum tank internal pressure PTANKMIN is obtained in the second determination mode.

If the answer of the step S33 is "Yes" (see the dashed line L3 and the time point t6 in FIG. 2), it is determined in step S34 that the evaporated fuel processing system has no leakage because the tank internal pressure PTANK has sharply decreased. Thus, the leakage determination process is completed.

If the value of the fourth count-up timer TM4 has reached the second determination period TPHASE2 in step S31 (at time t7 in FIG. 2) when the routine is re-entered, the bypass valve 36 is closed and the vent-shut valve 38 is opened in step S37. In step S38, a difference ΔP between the maximum tank internal pressure PTANKMAX and the minimum tank internal pressure PTANKMIN is calculated. In step S39, it is determined whether the calculated difference ΔP is greater than a value obtained by multiplying the third determination value ΔPTH by the correction coefficient K. If $\Delta P > (\Delta PTH \times K)$, it is determined that the evaporated fuel processing system 50 is normal (S40). If $\Delta P \leqq (\Delta PTH \times K)$, it is determined that the evaporated fuel processing system 50 has leakage (S41). The leakage determination process is completed.

Thus, it can be determined by the atmospheric pressure sensor whether the place where the vehicle is located is in highlands. In highlands where a large amount of evaporated fuel is generated, the first through third determination values are corrected so that their absolute values become larger. An erroneous determination caused due to the place where the vehicle is located can be avoided.

Figure 8:
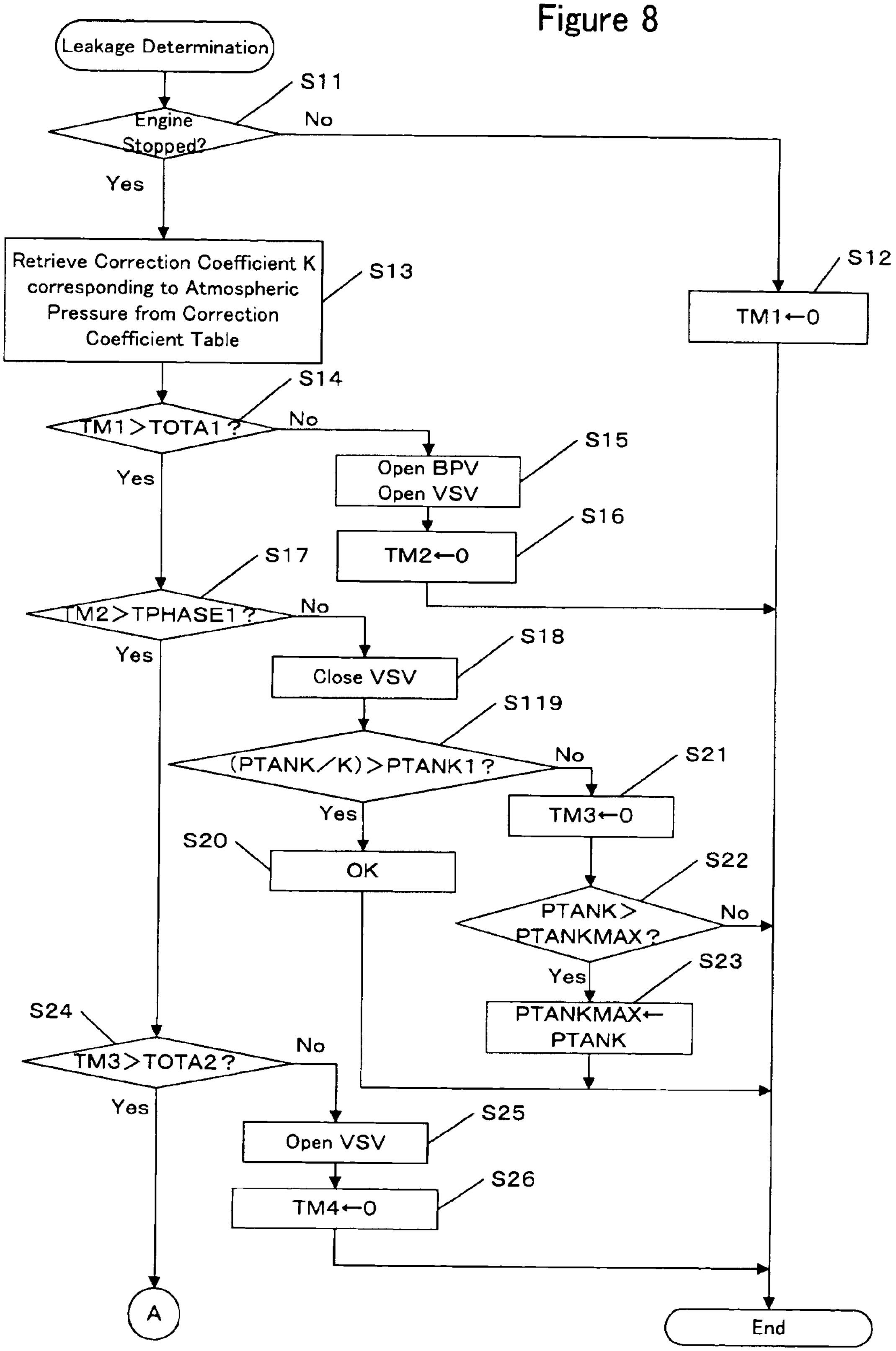
FIG. 8 shows a flowchart of a leakage determination process in accordance with another embodiment of the invention.
Figure 9:
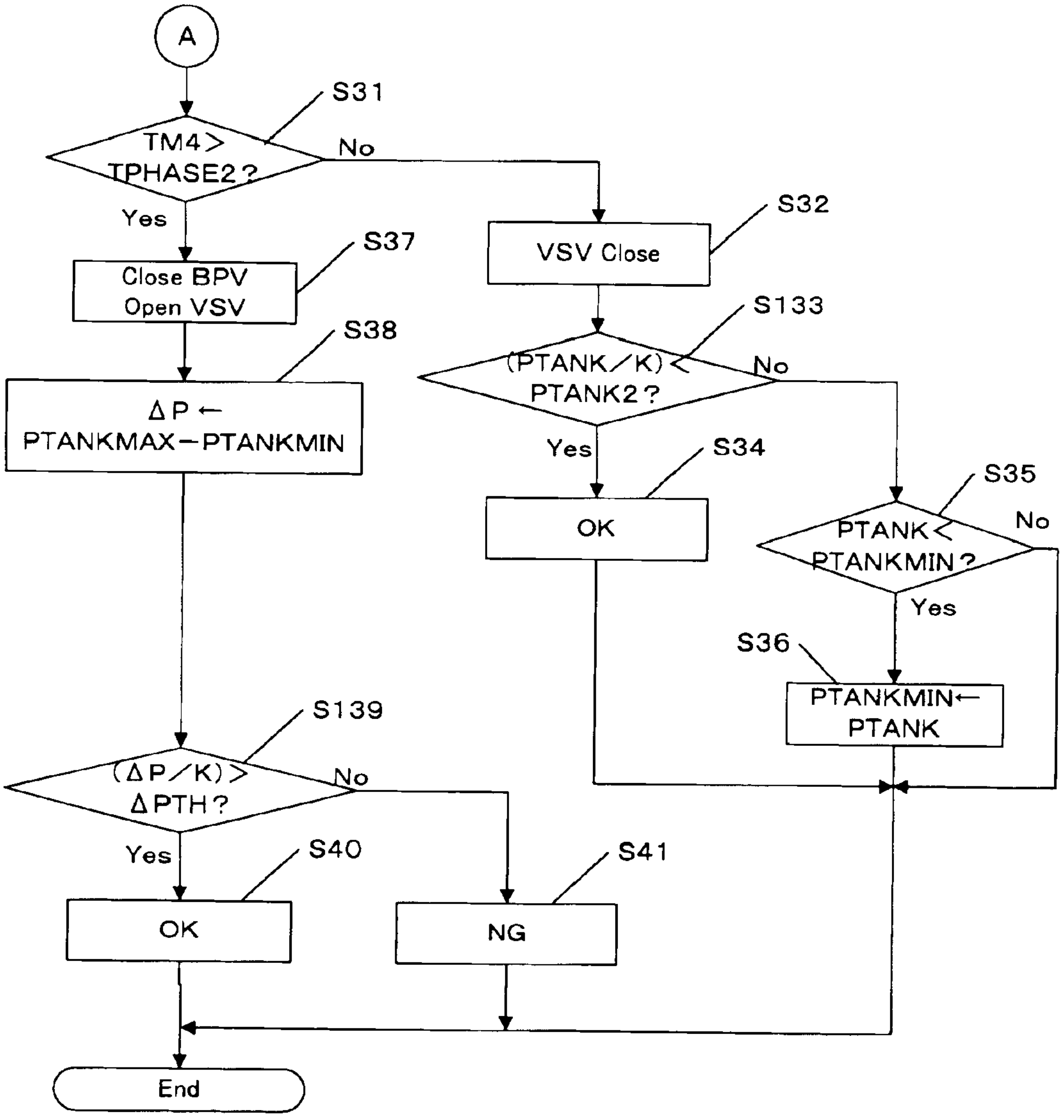
FIG. 9 shows a flowchart of a leakage determination process in accordance with another embodiment of the invention.

FIGS. 8 and 9 are a flowchart of a process for performing the leakage determination in accordance with the second embodiment of the present invention shown in FIG. 5. This process is carried out at a predetermined time interval (for example, every 100 milliseconds). Only steps S119, S133 and S139 of this process are different from the process according to the first embodiment shown in FIGS. 6 and 7. In the first embodiment, the tank internal pressure PTANK is compared with the value obtained by multiplying the first determination value PTANK1 by the correction coefficient K as shown in step S19. In contrast, in the second embodiment, the first determination value PTANK1 is compared with a value obtained by dividing the tank internal pressure PTANK by the correction coefficient K, as shown in step S119.

Similarly, in the first embodiment, the tank internal pressure PTANK is compared with the value obtained by multiplying the second determination value PTANK2 by the correction coefficient K, as shown in step S33. In contrast, in the second embodiment, the second determination value PTANK2 is compared with a value obtained by dividing the tank internal pressure PTANK by the correction coefficient K, as shown in step S133.

In the first embodiment, the difference ΔP is compared with the value obtained by multiplying the third determination value ΔPTH by the correction coefficient K, as shown in step S39. In contrast, in the second embodiment, the third determination value ΔPTH is compared with the value obtained by dividing the difference ΔP by the correction coefficient K, as shown in step S139.

Thus, in highlands where a large amount of evaporated fuel is generated, the tank internal pressure and the difference ΔP are corrected so that their absolute values become smaller. An erroneous determination caused due to the place where the vehicle is located can be avoided.

The invention may be applied to an engine to be used in a vessel-propelling machine such as an outboard motor in which a crankshaft is disposed in the perpendicular direction.

What is claimed is:

1. An apparatus for determining leakage in an evaporated fuel processing system, the evaporated fuel processing system extending from a fuel tank to a purge passage through which evaporated fuel from the fuel tank is purged to an intake manifold of an engine, the apparatus comprising:

a system pressure sensor for detecting a pressure of the evaporated fuel processing system;

an atmospheric pressure sensor for detecting an atmospheric pressure;

a control unit connected to the system pressure sensor and the atmospheric pressure sensor, the control unit configured to;

detect a stop of the engine;

correct a determination value according to the atmospheric pressure;

close the evaporated fuel processing system after the stop of the engine is detected; and determine whether the evaporated fuel processing system has leakage after the evaporated fuel processing system is closed based on the pressure detected by the system pressure sensor and the corrected determination value, wherein the correction for the determination value is made so that the determination value is made larger as the atmospheric pressure decreases.

2. The apparatus of claim 1, wherein the control unit is further configured to:

monitor the pressure detected by the system pressure sensor;

determine a change in the pressure detected by the system pressure sensor; and determine that the evaporated fuel processing system has leakage if the change in the pressure detected by the system pressure sensor is less than the corrected determination value.

3. An apparatus of claim 1, further comprising a table in which a coefficient corresponding to the atmospheric pressure is defined, wherein the control unit is further configured to:

retrieve the coefficient corresponding to the atmospheric pressure from the table; and correct the determination value with the retrieved coefficient.

4. The apparatus of claim 1, wherein the control unit is further configured to:

open the evaporated fuel processing system to the atmosphere if the stop of the engine is detected;

close the evaporated fuel processing system over a first determination period;

determination a maximum value of the pressure detected by the system pressure sensor during the first determination period;

open the evaporated fuel processing system to the atmosphere after the first determination period elapses;

close the evaporated fuel processing system over a second determination period;

determine a minimum value of the pressure detected by the system pressure sensor during the second determination period; and determine that the evaporated fuel processing system has leakage if a difference between the maximum value and the minimum value is less than the corrected determination value.

5. An apparatus for determining leakage in an evaporated fuel processing system, the evaporated fuel processing system extending from a fuel tank to a purge passage through which evaporated fuel from the fuel tank is purged to an intake manifold of an engine, the apparatus comprising:

a system pressure sensor for detecting a pressure of the evaporated fuel processing system;

an atmospheric pressure sensor for detecting an atmospheric pressure; and a control unit connected to the system pressure sensor and the atmospheric pressure sensor, the control unit configured to:

detect a stop of the engine;

retrieve a coefficient corresponding to the atmospheric pressure from the table;

correct the pressure detected by the system pressure sensor with the with the retrieved coefficient;

close the evaporated fuel processing system after the stop of the engine is detected; and determine whether the evaporated fuel processing system has leakage after the evaporated fuel processing system is closed based on the corrected pressure and a determination value.

6. The apparatus of claim 5, wherein the control unit is further configured to:

monitor the corrected pressure;

determine a change in the corrected pressure; and determine that the evaporated fuel processing system has leakage if the change in the corrected pressure is less than the determination value.

7. The apparatus of claim 5, wherein the correction for the pressure detected by the system pressure sensor is made so that the pressure is made lower as the atmospheric pressure decreases.

8. The apparatus of claim 5, wherein the control unit is further configured to:

open the evaporated fuel processing system to the atmosphere if the stop of the engine is detected;

close the evaporated fuel processing system over a first determination period;

determine a maximum value of the corrected pressure during the first determination period;

open the evaporated fuel processing system to the atmosphere after the first determination period elapses;

close the evaporated fuel processing system over a second determination period;

determine a minimum value of the corrected pressure during the second determination period; and determine that the evaporated fuel processing system has leakage if a difference between the maximum value and the minimum value is less than the determination value.

9. A method for determining leakage in an evaporated fuel processing system, the evaporated fuel processing system extending from a fuel tank to a purge passage through which evaporated fuel from the fuel tank is purged to an intake manifold of an engine, comprising the steps of:

detecting a pressure on the evaporated fuel processing system;

detecting an atmospheric pressure;

detecting a stop of the engine;

correcting a determination value according to the atmospheric pressure, said step of correcting the determination value comprising correcting the determination value so that the determination value is made larger as the atmospheric pressure decreases;

closing the evaporated fuel processing system after the stop of the engine is detected; and determining whether the evaporated fuel processing system has leakage after the evaporated fuel processing system is closed based on the detected pressure of the evaporated fuel processing system and the corrected determination value.

10. The method of claim 9, further comprising the steps of:

monitoring the pressure of the evaporated fuel processing system;

determining a change in the pressure of the evaporated fuel processing system; and determining that the evaporated fuel processing system has leakage if the change in the pressure of the evaporated fuel processing system is less than the corrected determination value.

11. The method of claim 9, further comprising the steps of:

accessing a table in which a coefficient corresponding to the atmospheric pressure is defined:

retrieving the coefficient corresponding to the atmospheric pressure from the table; and correcting the determination value with the retrieved coefficient.

12. The method of claim 9, further comprising the steps of:

opening the evaporated fuel processing system to the atmosphere if the stop of the engine is detected;

closing the evaporated fuel processing system over a first determination period;

determining a maximum value of the pressure of the evaporated fuel processing system during the first determination period;

opening the evaporated fuel processing system to the atmosphere after the first determination period elapses;

closing the evaporated fuel processing system over a second determination period;

determining a minimum value of the pressure of the evaporated fuel processing system during the second determination period; and determining that the evaporated fuel processing system has leakage if a difference between the maximum value and the minimum value is less than the corrected determination value.

13. A method for determining leakage in an evaporated fuel processing system, the evaporated fuel processing system extending from a fuel tank to a purge passage through which evaporated fuel from the fuel tank is purged to an intake manifold of an engine, comprising the steps of:

detecting a pressure of the evaporated fuel processing system;

detecting an atmospheric pressure;

detecting a stop of the engine;

retrieving a coefficient corresponding to the atmospheric pressure from a table in which the coefficient corresponding to the atmospheric pressure is defined;

correcting the detected pressure of the evaporated fuel processing system with the retrieved coefficient;

closing the evaporated fuel processing system after the stop of the engine is detected; and determining whether the evaporated fuel processing system has leakage after the evaporated fuel processing system is closed based on the corrected pressure and a determination value.

14. An apparatus for determining leakage in an evaporated fuel processing system, the evaporated fuel processing system extending from a fuel tank to a purge passage through which evaporated fuel from the fuel tank is purged to an intake manifold of an engine, the apparatus comprising:

means for detecting a pressure of the evaporated fuel processing system;

means for detecting an atmospheric pressure:

means for detecting a stop of the engine;

means for correcting a determination value according to the atmospheric pressure, the means for correcting a determination value comprises means for correcting the determination value so that the determination value is made larger as the atmospheric pressure decreases;

means for closing the evaporated fuel processing system after the stop of the engine is detected; and means for determining whether the evaporated fuel processing system has leakage after the evaporated fuel processing system is closed based on the pressure detected by the system pressure sensor and the corrected determination value.

15. The apparatus of claim 14, further comprising:

means for monitoring the pressure of the evaporated fuel processing system;

means for determining a change in the pressure of the evaporated fuel processing system; and means for determining that the evaporated fuel processing system has leakage if the change in the pressure of the evaporated fuel processing system is less than the corrected determination value.

16. The apparatus of claim 14, further comprising:

means for accessing a table in which a coefficient corresponding to the atmospheric pressure is defined, means for retrieving the coefficient corresponding to the atmospheric pressure from the table; and means for correcting the determination value with the retrieved coefficient.

17. The apparatus of claim 14, further comprising:

means for opening the evaporated fuel processing system to the atmosphere if the stop of the engine is detected;

means for closing the evaporated fuel processing system over a first determination period;

means for determining a maximum value of the pressure of the evaporated fuel processing system during the first determination period;

means for opening the evaporated fuel processing system to the atmosphere after the first determination period elapses;

means for closing the evaporated fuel processing system over a second determination period;

means for determining a minimum value of the pressure of the evaporated fuel processing system during the second determination period; and means for determining that the evaporated fuel processing system has leakage if a difference between the maximum value and the minimum value is less than the corrected determination value.

18. An apparatus for determining leakage in an value fuel processing system, the evaporated fuel processing system extending from a fuel tank to a purge passage through which evaporated fuel from the fuel tank is purged to an intake manifold of an engine, the apparatus comprising:

means for detecting a pressure of the evaporated fuel processing system;

means for detecting an atmospheric pressure;

means for detecting a stop of the engine;

means for storing a table for defining a coefficient corresponding to the atmospheric pressure;

means for retrieving the coefficient corresponding to the atmospheric pressure from the table;

means for correcting the detected pressure of the evaporated fuel processing system the retrieved coefficient;

means for closing the evaporated fuel processing system after the stop of the engine is detected; and means for determining whether the evaporated fuel processing system has leakage after the evaporated fuel processing system is closed based on the corrected pressure and a determination value.

* * * * *